United States Patent [19]

Kuka

[11] 4,354,063

[45] Oct. 12, 1982

[54] TELEPHONE HANDSET WITH ILLUMINATED MAGNIFIER

[76] Inventor: James M. Kuka, P.O. Box 971, Reno, Nev. 89504

[21] Appl. No.: 130,253

[22] Filed: Mar. 14, 1980

[51] Int. Cl.³ .................... H04M 1/02; H04M 1/22
[52] U.S. Cl. .................... 179/103; D14/63; D16/135; 179/81 C; 179/178; 362/88
[58] Field of Search ............ 179/81 C, 84 L, 100 R, 179/103, 178, 179; 40/336, 338, 339; 350/235, 236, 237; 362/24, 88, 109, 157, 309; D14/63; D16/135

[56] References Cited

U.S. PATENT DOCUMENTS

| | | | |
|---|---|---|---|
| 1,100,480 | 6/1914 | Haralson et al. | 362/24 |
| 1,762,809 | 6/1930 | Bradford | 40/339 |
| 2,316,301 | 4/1943 | Ullman | 350/237 |
| 2,991,334 | 7/1961 | Wandel | 350/245 |
| 3,448,258 | 6/1969 | Vallas | 350/237 |
| 3,651,285 | 3/1972 | Tomaiuolo | 179/178 |
| 3,945,717 | 3/1976 | Ryder et al. | 350/237 |

FOREIGN PATENT DOCUMENTS 1957678  5/1971  Fed. Rep. of Germany ........ 362/88

Primary Examiner—Bernard Konick
Assistant Examiner—Randall P. Myers

[57] ABSTRACT

A telephone handset having a magnifying reading glass lens built into the housing along with an electric light bulb positioned to illuminate the field of view of the lens. The end of the handset housing opposite the cord is elongated to accommodate the lens and light bulb, and a pressure operated switch for controlling the light is also mounted in the handset housing. The light bulb is supplied with current via the switch by wires contained within the telephone cord or cable.

2 Claims, 4 Drawing Figures

TELEPHONE HANDSET WITH ILLUMINATED MAGNIFIER

BACKGROUND OF THE INVENTION

1. Field of the Invention

This invention relates to a telephone handset, and more particularly to apparatus for facilitating operation of the telephone and the reading of the telephone book.

2. Description of the Prior Art

Many people, particularly those of advancing age or those having eye problems, find it difficult to read the fine print of a typical telephone book. Many people even find it difficult to see the letters and numbers on a telephone dial or on touch tone buttons. Such people have often had to resort to a hand-held magnifying or reading glass. Sometimes these devices have been equipped with a light source for illuminating the material in the field of view of the lens. A typical device of this type may be found in U.S. Pat. No. 3,945,717 issued to Ryder et al. on Mar. 23, 1976.

Another device of this general character, particularly adapted for use in telephone booths, is shown in U.S. Pat. No. 3,448,258 issued to T. L. Vallas on June 3, 1969. The latter device is attached to the wall of the telephone booth by an armored cable which also supplies current to the light source, thus eliminating batteries.

A device for illuminating the telephone dial has been proposed in the form of an attachment which may be mounted on the vertical post of the now obsolete type telephone having the transmitter mounted at the upper end of the post and a receiver mounted on the end of the cord, see U.S. Pat. No. 1,762,809 to A. G. Bradford.

U.S. Pat. No. 2,991,334 issued to B. Wandel on July 4, 1969 discloses a shoulder support attachment for a telephone handset of the modern type having the receiver and transmitter mounted at opposite ends of a central handle, the device being removably attached to the central handle. A magnifying lens is incorporated into the shoulder support attachment.

The Wandel and Bradford devices attach directly to the telephone to make sure the devices are at hand whenever their use is required.

SUMMARY OF THE INVENTION

The present invention provides the advantages of the prior art while overcoming a number of difficulties such as bulkiness, awkward mode of use, limited use possibilities, expense, and unattractive appearance. This is accomplished in the present invention by modifying the housing of the telephone handset and incorporating the magnifying lens, light source, and control switch integrally into the handset.

Specifically, in the present invention, one end of the telephone handset is elongated, preferably the receiver end, and the magnifying lens is embedded in an opening formed in the extended portion of the handset housing. The light source is also embedded in the handset housing, as is the control switch.

The described structure particularly lends itself to supplying the electricity for the light source through wires contained within the cable which also contains the telephone wires. This eliminates any need for batteries, and with the various components being integrated into the handset, its appearance remains attractive and may even be enhanced.

It is therefore an object of the present invention to incorporate a magnifying lens and light source into the telephone handset in such manner as to facilitate use of the magnifying lens for reading entries in a telephone book, handwritten notations, dial numbers, etc.

Another object of the present invention is to provide a structure of the character described which is attractive in appearance and which may readily be incorporated into existing telephone technology.

A further object of the present invention is to provide apparatus of the character set forth in which electrical supply for the light source may be incorporated into the conventional telephone cord, and in which current is drawn for illumination only when required by the user.

Other objects and features of advantage will become apparent as the specification progresses and from the claims.

Figure 1:
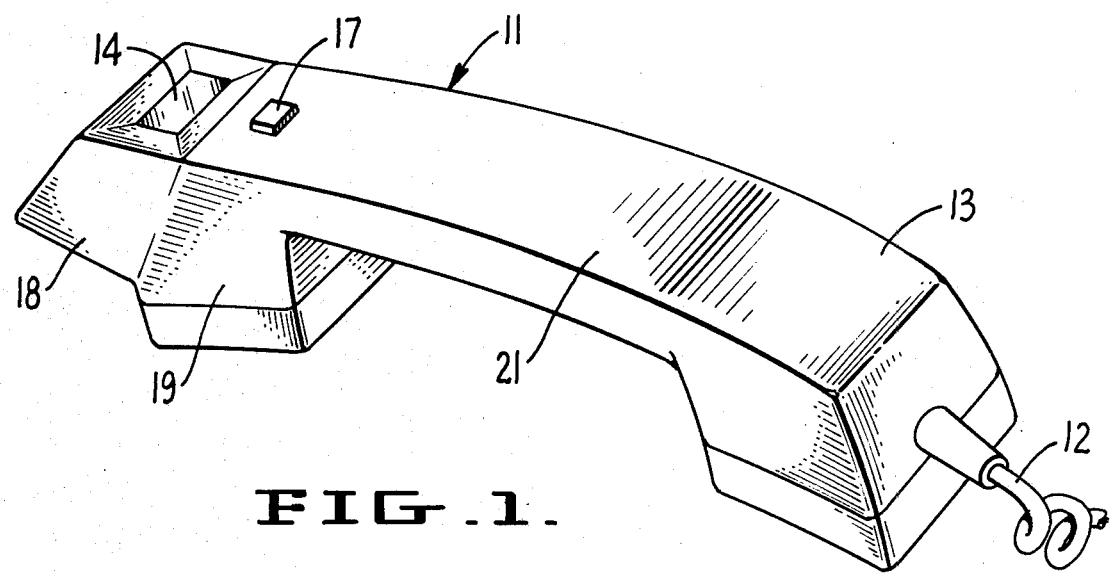
FIG. 1 is a perspective view of a telephone handset constructed in accordance with the present invention.

While only the preferred form of the invention is illustrated in the drawings, it will be apparent that various modifications could be made without departing from the ambit of the claims.

DESCRIPTION OF THE PREFERRED EMBODIMENTS

As may be seen in the accompanying drawings, the telephone handset of the present invention has a housing 11 containing the usual receiver 9 and transmitter 10 which are connected to the telephone lines via a cable 12 which normally extends from the end 13 of the housing containing the transmitter. In accordance with the present invention, apparatus is incorporated into the telephone handset to provide visual assistance for facilitating operation of the telephone, as by dialing, and particularly for reading the fine print of a telephone book or other written or printed notations. This apparatus consists essentially of a magnifying lens 14 embedded in the housing 11 and adapted for use as a reading glass.

Also in accordance with the present invention, a light source 16 is also embedded in the housing 11 in position to illuminate the field of view of the magnifying lens 14. Preferably, the light source is an electric light bulb connected to a source of electrical current (not shown) by wires 15 and 15A which also pass through the cable 12.

To conserve power and extend the life of the light bulb 16, a spring loaded switch 17, also mounted in housing 11, is interposed in wire 15 between the light bulb 16 and the source of electrical current so that the light is operative only when the switch is being pressed to its on position.

While the magnifying lens 14, light source 16, and switch 17 may be incorporated or embedded in the housing 11 at any convenient location, I prefer to form the housing 11 with an integral extended portion 18, said portion being relieved to provide an opening therethrough across which the magnifying lens 14 is mounted. Preferably, the extent that portion 18 comprises an extension of the housing on the end 19 normally containing the receiver, that is, on the end opposite to the cable 12.

Figure 2:
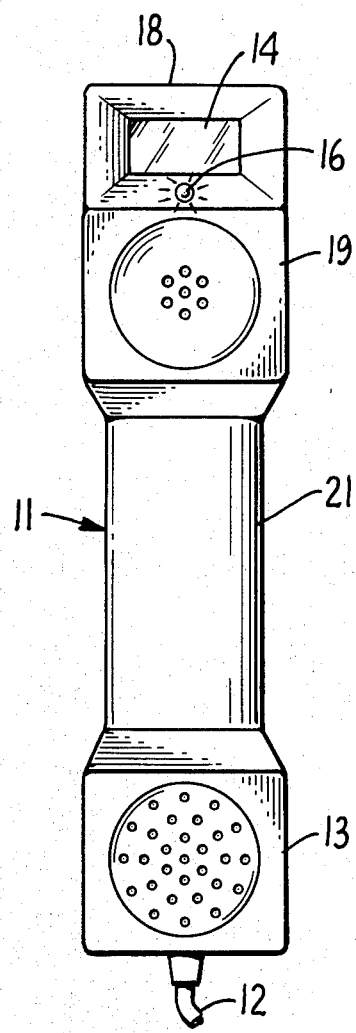
FIG. 2 is a bottom plan view of the telephone handset of FIG. 1.
Figure 3:
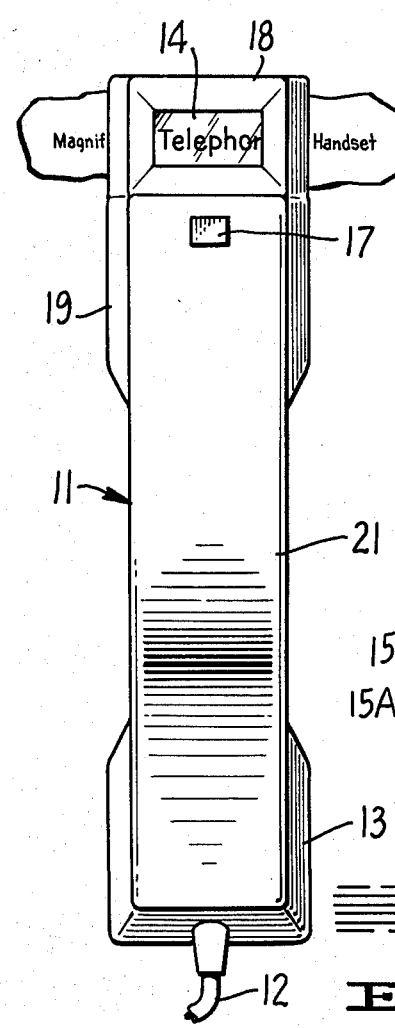
FIG. 3 is a top plan view of the telephone handset of FIG. 1 illustrating the mode of use.
Figure 4:
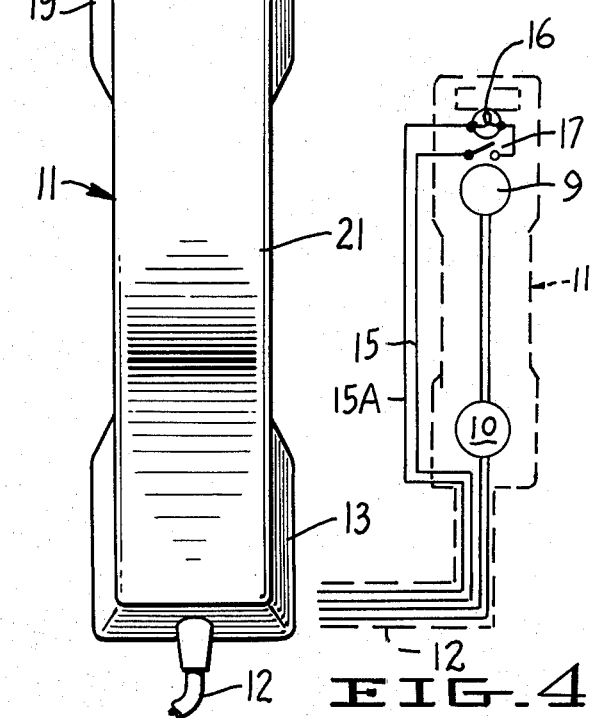
FIG. 4 is a circuit diagram on a reduced scale of the telephone handset of FIG. 1.

The light source 16 may then conveniently be positioned adjacent to the lens 14 in the manner illustrated in FIG. 2 of the drawings. The switch 17 may be mounted at any convenient point along the handle portion 21 of the housing 11, the switch 17 here being illustrated as being positioned near the lens 14. Note also that the extended portion 18 is wide enough to permit installation of an elongated rectangular magnifying lens 14, to facilitate reading the telephone book line by line.

From the foregoing, it will be apparent that my telephone handset incorporating a magnifying lens, light source, and control switch conveniently facilitates reading of telephone numbers and dialing of the telephone, while actually enhancing the appearance of the telephone handset and requiring no external attachments which could become detached and lost.

What I claim as new and desire to secure by Letters Patent is:

1. A telephone handset, comprising a housing having a manually graspable portion providing a handle,
   a receiving device mounted in said housing at one end of said handle,
   a transmitting device mounted in said housing at the other end of said housing,
   said housing having a portion extending beyond said transmitting device, and said portion being formed with an opening therethrough,
   a magnifying lens mounted across said opening,
   an electric light bulb mounted in said housing for illuminating the field of view of said lens,
   a cable containing telephone wires connected to said transmitter and receiver, and
   electrical wires for supplying electric current to said light bulb also contained in said cable.

2. A telephone handset as described in claim 1 and wherein a pushbottom switch is connected to said electrical wires for selectively energizing said light bulb, and is also mounted in said housing.

* * * * *